(12) United States Patent
Lee et al.

(10) Patent No.: US 6,825,911 B2
(45) Date of Patent: Nov. 30, 2004

(54) ARRAY TESTING SYSTEM ON ARRAY SUBSTRATE HAVING MULTIPLE CELLS

(75) Inventors: Su-Woong Lee, Gyeongxangbuk-do (KR); Chang-Hoon Lee, Gyeongxangbuk-do (KR)

(73) Assignee: LG. Philips LCD Co., Ltd., Seoul (KR)

( * ) Notice: Subject to any disclaimer, the term of this patent is extended or adjusted under 35 U.S.C. 154(b) by 0 days.

(21) Appl. No.: 10/423,020

(22) Filed: Apr. 25, 2003

(65) Prior Publication Data
US 2004/0125307 A1 Jul. 1, 2004

(30) Foreign Application Priority Data
Dec. 31, 2002 (KR) .................................. 2002-0088488

(51) Int. Cl.[7] .......................................... G02F 1/1345
(52) U.S. Cl. ...................................... 349/192; 324/770
(58) Field of Search .......................... 349/54, 40, 192; 324/770

(56) References Cited

U.S. PATENT DOCUMENTS 5,546,013 A    8/1996  Ichioka et al.
6,111,621 A  * 8/2000  Kim et al. .................... 349/54
6,677,171 B1 * 1/2004  Nagata et al. ................ 438/17
6,678,017 B1 * 1/2004  Shimomaki et al. .......... 349/40
6,731,368 B2 * 5/2004  Yu et al. .................... 349/187
6,734,940 B2 * 5/2004  Hirabayashi ................ 349/149

FOREIGN PATENT DOCUMENTS

JP    6-82836    3/1994
JP    8-320502   12/1996
JP    9-33874    2/1997

* cited by examiner

Primary Examiner—Kenneth Parker
(74) Attorney, Agent, or Firm—Morgan Lewis & Bockius LLP

(57) ABSTRACT

A substrate has an array testing system for use in a liquid crystal display device. The substrate includes a plurality of array cells each including a display area, a non-display area surrounding the display area, and a pad area adjacent to first and second sides of the non-display area. The substrate further includes a plurality of test pads outside the plurality of array cells and a plurality of test lines each connecting a corresponding one of the array cells with a corresponding one of the test pads. Here, each one of the test lines partially pass through the non-display area of an array cell adjacent to the corresponding one of the array cells.

18 Claims, 4 Drawing Sheets

ARRAY TESTING SYSTEM ON ARRAY SUBSTRATE HAVING MULTIPLE CELLS

The present application claims the benefit of Korean Patent Application No. 2002-0088488 filed in Korea on Dec. 31, 2002, which is hereby incorporated by reference.

BACKGROUND OF THE INVENTION

1. Field of the Invention

The present invention relates to an array substrate for use in liquid crystal display devices, and more particularly, to an array substrate having multiple cells and an array testing system implanted thereon.

2. Discussion of the Related Art

A liquid crystal display device uses the optical anisotropy and polarization properties of liquid crystal molecules to produce an image. Liquid crystal molecules have a definite alignment orientation due to their long, thin shapes. The alignment orientation can be controlled by application of an electric field. Accordingly, the alignment of the liquid crystal molecules can be altered by changing the applied electric field. Due to the optical anisotropy of the liquid crystal molecules, refraction of incident light is dependent upon the orientation of the aligned liquid crystal molecules. Therefore, by controlling the electric field applied to the liquid crystal molecules, an image can be produced by the liquid crystal display device.

Liquid crystal display (LCD) devices have wide application in office automation (OA) and video equipment because of their light weight, thin design, and low power consumption characteristics. Among the different types of LCD devices, active matrix LCDs (AM-LCDs), which have thin film transistors and pixel electrodes arranged in a matrix form, offer high resolution and superiority in displaying moving images. A typical LCD panel has an upper substrate, a lower substrate and a liquid crystal material layer interposed therebetween. The upper substrate, commonly referred to as a color filter substrate, includes a common electrode and color filters. The lower substrate, commonly referred to as an array substrate, includes switching elements, such as thin film transistors (TFTs), and pixel electrodes, for example.

As previously described, operation of an LCD device is based on the principle that the alignment direction of the liquid crystal molecules is dependent upon an applied electric field between the common electrode and the pixel electrode. Accordingly, the liquid crystal molecules function as an optical modulation element having variable optical characteristics that depend upon polarity of the applied voltage.

When fabricating the liquid crystal panel, a first substrate (i.e., lower substrate or array substrate) and a second substrate (i.e., upper substrate or color filter substrate) are previously fabricated and then bonded and aligned to each other. Thereafter, liquid crystal material is interposed between the first and second substrates. Then, the attached substrates are divided into individual liquid crystal cells.

The fabrication process for the first substrate includes many thin film deposition processes to form insulating layers, semiconductor layers and conductive layers, as well as many etching and/or patterning processes to form desired layer patterns, thereby forming a plurality of thin film transistors, pixels and other layer elements. At this time of manufacturing the first substrate, a plurality of array cells each including the plurality of thin film transistors and array elements are formed on a large substrate to decrease fabrication process steps. In such a manner, a plurality of color filter cells each corresponding to each array cell are formed on a large substrate that is for the second substrates of the liquid crystal display panel. Those two large substrates respectively having the plurality of array cells and color filter cells are attached to each other with the liquid crystal layer interposed therebetween, thereby forming the liquid crystal display panel. Thereafter, the attached liquid crystal panel is cut and divided into the liquid crystal cells.

Before attaching the two large substrates, the large first substrate (array substrate) is tested by an array testing system to analyze whether the large array substrate has any defects. The large first substrate is often called as an array testing substrate because this substrate has many array cells for the array test with a plurality of test pads and test lines.

FIG. 1 is a plan view illustrating an array testing substrate having a plurality of array cells according to the related art. FIG. 2 is an enlarged plan view of an array cell of FIG. 1 and array cells adjacent thereto.

As mentioned before, the array substrate for the array test includes a plurality of array cells 10. Each array cell 10 has divided regions of a display area 20, a non-display area 30 and a pad area 40. The display area 20 includes a plurality of pixels P each having a thin film transistor T to show images. The non-display area 30 is disposed surrounding the display area 20. The pad area 40 is disposed just adjacent to bottom and left sides of the non-display area 30.

In the display area 20, as shown in FIG. 2, a plurality of gate lines 22 and a plurality of data lines 26 are disposed on the substrate, respectively, in columns and rows. The gate lines 22 perpendicularly cross the data lines 26, thereby defining the pixels P in a matrix type. A pixel electrode 59 is disposed corresponding to each pixel P, and the thin film transistor T is disposed at a corner of the pixel P near the crossing of the gate and data lines 22 and 26. Each thin film transistor T includes a gate electrode (not shown) that extends from the gate line 22, a source electrode (not shown) that extends from the data line 26, and a drain electrode (not shown) that is connected with the pixel electrode 59.

The non-display area 30 is a region where a seal pattern is placed to attach the color filter substrate to the array substrate. Since the non-display area 30 does not include any pixels P, the non-display area 30 would be unable to show images when the array cell 10 is adopted in the liquid crystal display panel.

A plurality of gate pads 24 and a plurality of data pads 28 are disposed in the pad area 40. The plurality of gate pads 24 are connected with the plurality of gate lines 22, respectively, and disposed at the bottom portion of the pad area 40. In this same manner, the plurality of data pads 28 are connected with the plurality of data lines 22, respectively, and are disposed at the left portion of the pad area 40. Thus, the pad area 40 is divided into a gate pad area 42 where the gate pads 24 are placed, and a data pad area 44 where the data pads 28 are placed. The gate pads 24 and the data pads 28 act as connection terminals that electrically connect the gate and data lines 22 and 26 to the external driving circuits.

Still referring to FIGS. 1 and 2, the array substrate includes the plurality of array cells 10 and a plurality of test pads 50 each corresponding to each array cell 10. The array substrate also includes test lines 60 each connecting the test pad 50 to the corresponding array cell 10. The test pad 50 acts as an input terminal by way of receiving signals from the array testing apparatus during the array test.

In FIG. 1, the test pads 50 are generally disposed at top and bottom peripheries of the large array substrate. The test line 60 connects the test pad 50 to the gate and data pads 24 and 28 of the corresponding array cell 10 such that the test line 60 has a one-to-one connection between the test pad 50 and the array cell 10. Each test pad 50 includes at least one gate test pad 52 that is connected with the gate pads 24 of the array cell 10, and at least one data test pad 54 that is connected with the data pads 28. In this manner, the test line 60 is divided into a gate test line 62 that connects the plurality of gate pads 24 to the gate test pad 52 and a data test line 64 that connects the plurality of data pads 28 to the data test pad 54. These test pads 50 and test lines 60 can be formed together with the gate lines 22 and/or the data lines 26 in a same process step.

The array testing apparatus inspects the above-described array substrate by way of applying first and second voltages to the gate test pad 52 and data test pad 54, respectively. Thus, when the pixel electrodes 59 generate electric fields in the pixels P and the electric fields are converted into a light signal, the array testing apparatus perceives and analyzes the light signal and determines whether each pixel P is defective and whether the gate and data lines 22 and 26 are opened or broken. At this time of testing the array substrate using the array tester, the first voltage applied to the gate lines 22 throughout the gate test pad 52 becomes an ON/OFF voltage that turns on and off the thin film transistors T. The second voltage applied to the data line 26 through the data test pad 54 becomes a standard voltage that determines the degree of rotation of the liquid crystal molecules.

Meanwhile, after the array test, the array substrate is cut and divided into the array cells 10 along cutting lines S–S' as shown in FIG. 2. At this time, the test pads 50 and the test lines 60 are also removed by cutting along lines S–S' of FIG. 2. Actually, the test pads 50 and the test lines 60 are used only for the array test and do not play other roles. Thus, those test pads and lines 50 and 60 are required to be removed. Namely, when a scribing process cuts the large array substrate into each array cell 10 for making a liquid crystal display panel, the test pads and lines 50 and 60 are cut away from the array cells 10.

In order to scribe and cut the array substrate and divide into the array cells 10, the array cells 10 are spaced apart from one another and the corresponding test line 60 is placed in that space between two array cells 10. Namely, the array cells 10 are disposed on the large array substrate in up-and-down and left-and-right directions, and the test line 60 is placed in a space L1 between array cells 10 that are disposed in a row. The space L1 can be called an test line area where the test line 60 is placed. Further, the gate pad area 42 is usually disposed at the bottom of each array cell 10, and the data pad area 44 is disposed at the left side of each array cell 10, as shown in FIG. 2.

FIG. 2 shows the scribing process to form the individual array cell 10. Here, the first cutting line S1–S1' corresponds to a left outer line of the pad area 40, the second cutting line S2–S2' corresponds to a right outer line of the non-display area 30, the third cutting line S3–S3' corresponds to a top outer line of the non-display area 30, and the fourth cutting line S4–S4' corresponds to a bottom outer line of the pad area 40. Thus, since the array substrate is cut along the lines S–S', the test pads 50 and the test lines 60 are removed from the array cells 10.

However, the array substrate designed to be like FIG. 2 has some disadvantages. Since the spaces L1 are disposed among the horizontally arranged array cells 10 and the test lines 60 only used for the array test are placed in those spaces L1, the array cells 10 are spaced apart by the space L1. That is, the array cells 10 are ineffectively organized on the array substrate.

SUMMARY OF THE INVENTION

Accordingly, the present invention is directed to an array substrate for an LCD device that substantially obviates one or more of the problems due to limitations and disadvantages of the related art.

An object of the present invention is to provide an array substrate maximizing spatial availability.

Another object of the present invention is to provide an array substrate having a improved spatial effectiveness.

Additional features and advantages of the invention will be set forth in the description which follows, and in part will be apparent from the description, or may be learned by practice of the invention. The objectives and other advantages of the invention will be realized and attained by the structure particularly pointed out in the written description and claims hereof as well as the appended drawings.

To achieve these and other advantages and in accordance with the purpose of the present invention, as embodied and broadly described, a substrate having an array testing system for use in a liquid crystal display device comprises a plurality of array cells each including a display area, a non-display area surrounding the display area, and a pad area disposed adjacent to first and second sides of the non-display area; a plurality of test pads disposed outside the plurality of array cells; and a plurality of test lines each connecting a corresponding one of the array cells with a corresponding one of the test pads, each one of the test lines partially passing through the non-display area of an array cell adjacent to the corresponding one of the array cells.

In another aspect, a method of manufacturing a liquid crystal display device comprises the steps of forming a plurality of array cells on an array substrate, each array cell including a display area, a non-display area surrounding the display area, and a pad area disposed adjacent to first and second sides of the non-display area; forming a plurality of test pads on the array substrate each disposed outside the plurality of array cells; forming a plurality of test lines on the array substrate each connecting a corresponding one of the array cells with a corresponding one of the test pads, each one of the test lines partially passing through the non-display area of an array cell adjacent to the corresponding one of the array cells; testing the array substrate using the test pads and the test lines; and dividing the array substrate into individual array cells.

It is to be understood that both the foregoing general description and the following detailed description are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this specification, illustrate embodiments of the invention and together with the description serve to explain the principles of the invention. In the drawings.

DETAILED DESCRIPTION OF THE PREFERRED EMBODIMENTS

Reference will now be made in detail to the preferred embodiments of the present invention, examples of which are illustrated in the accompanying drawings.

Figure 3:
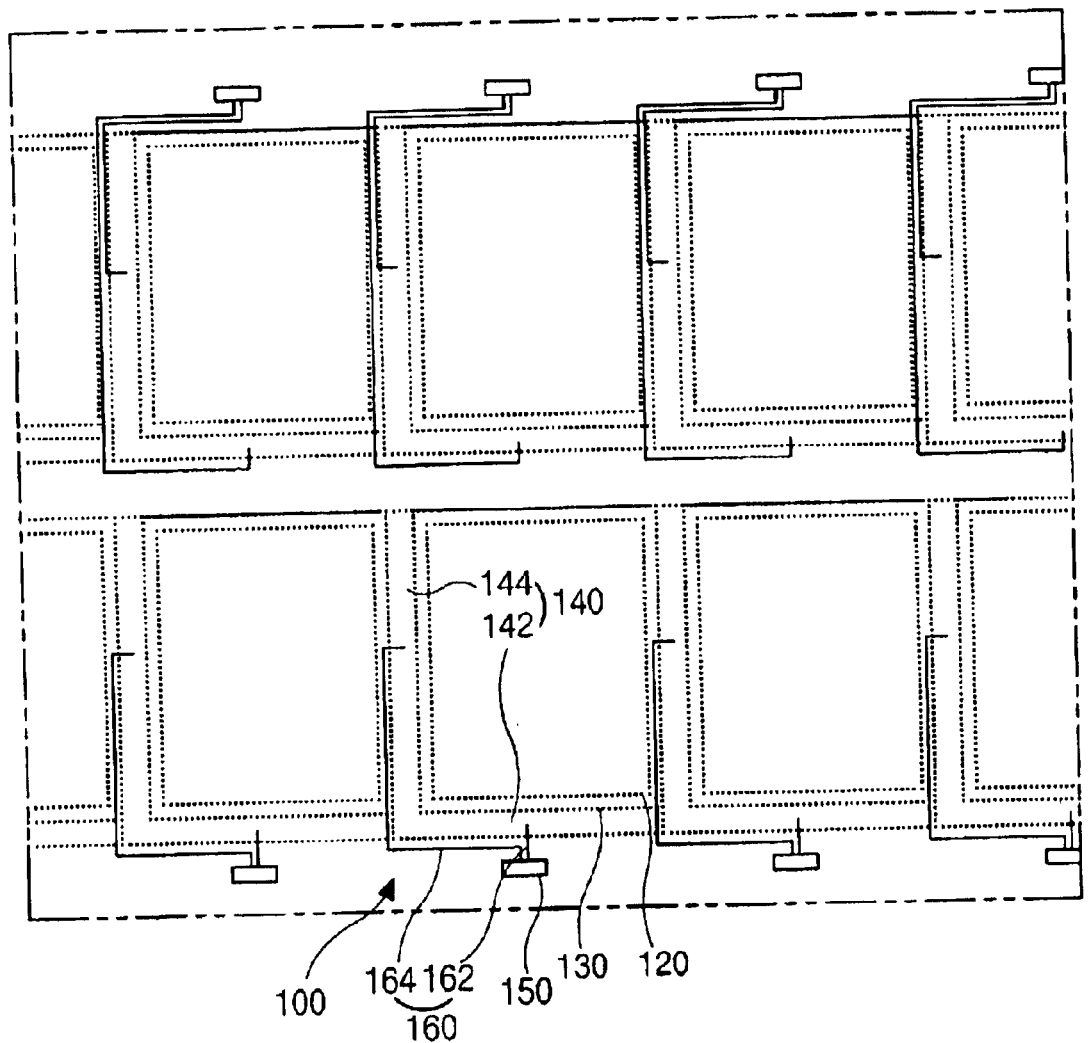
FIG. 3 is a plan view illustrating an array testing substrate having a plurality of array cells according to the present invention.
Figure 4:
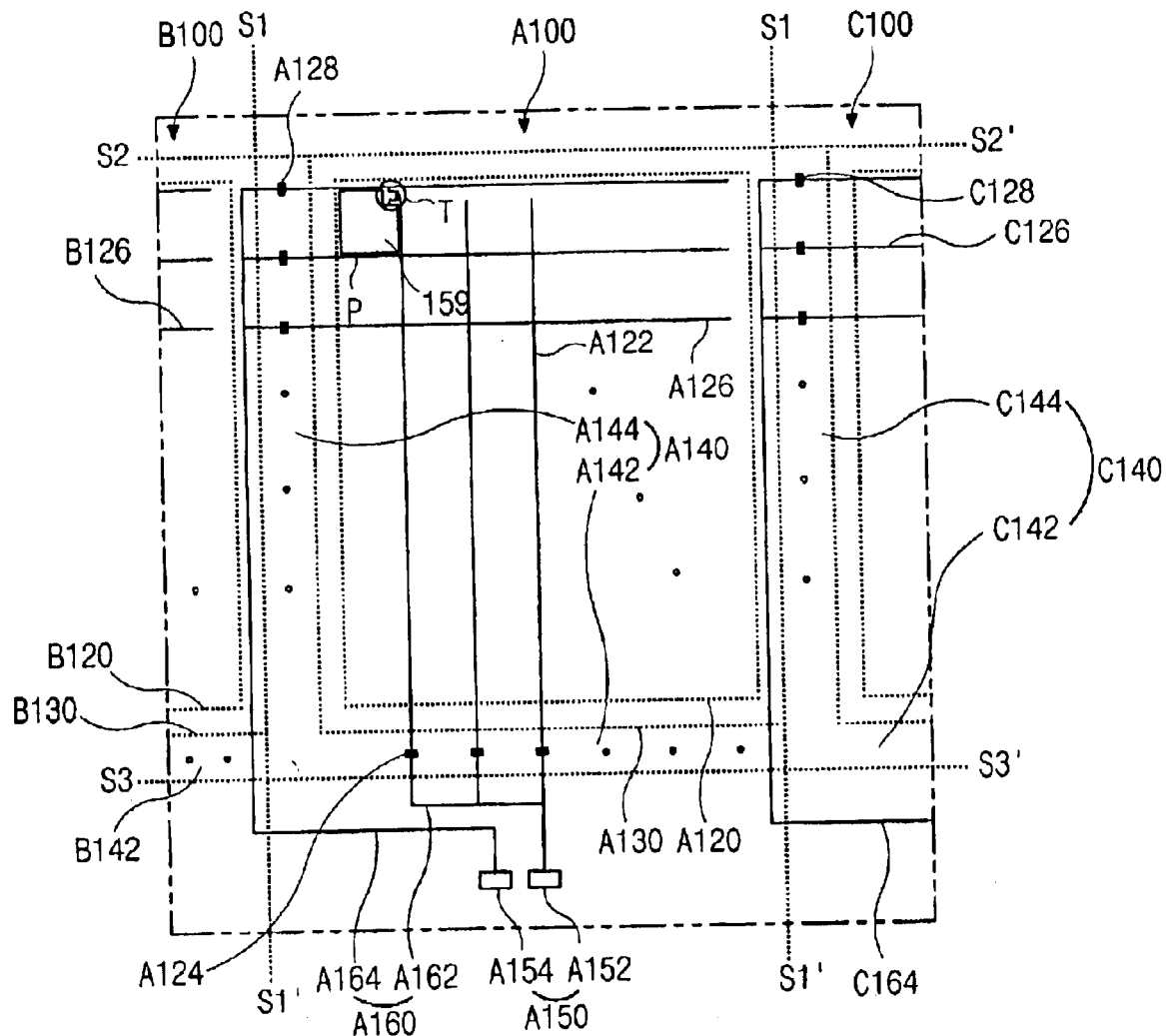
FIG. 4 is an enlarged plan view of an array cell and adjacent array cells of FIG. 3.

FIG. 3 is a plan view illustrating an array testing substrate having a plurality of array cells according to the present invention, and FIG. 4 is an enlarged plan view of a first array cell and just adjacent second and third array cells according to the present invention. In FIG. 4, a letter is used with the reference sign for each item or part to designate with which array cell the item or part is associated. For example, FIG. 4 shows the first array cell A100, the second array cell B100, and the third array cell C100. Wherever possible, the same reference numbers will be used throughout the drawings to refer to same or similar parts.

As shown in FIGS. 3 and 4, a substrate for use in the LCD according to the present invention includes a plurality of array cells 100, a plurality of test pads 150 each corresponding to each array cell 100, a plurality of test lines 160 one-to-one connecting the array cell 100 to the corresponding test pad 150. In the following description, an IPT-MPS (In Process Test Multi Pattern Search) testing system may be used. However, of course other array testing systems may be used in accordance with the present invention. Each array cell 100 includes a display area 120 in a center portion, a non-display area 130 surrounding the display area 120, and a pad area 140 disposed just adjacent to bottom and left sides of the non-display area 130.

The display area 120 includes a plurality of gate lines 122 and a plurality of data lines 126 in column and row directions, respectively. The gate lines 122 and data lines 126 perpendicularly cross each other and then define a plurality of pixels P in a matrix type. Each pixel P has a thin film transistor T and a corresponding pixel electrode 159. The thin film transistor T is located at a corner of pixel P near the crossing of the gate and data lines 122 and 126. Each thin film transistor T includes a gate electrode (not shown) that extends from the gate line 122, a source electrode (not shown) that extends from the data line 126, and a drain electrode (not shown) that is connected with the pixel electrode 159. The thin film transistor T is turned on and off by a first voltage that is applied through the gate line 122, and then acts as a switching element that delivers a second voltage from the data line 126 to the pixel electrode 159.

The non-display area 130 is a region where seal patterns are placed to attach the color filter substrate to the array substrate. Since the non-display area 130 does not include any pixels P, the non-display area 130 would be unable to show the images when the array cell 100 is adopted in the liquid crystal display panel.

As mentioned before, the pad area 140 is disposed just adjacent to the bottom and left sides of the non-display area 130, and a plurality of gate pads 124 and a plurality of data pads 128 are disposed therein. The plurality of gate pads 124 are respectively connected with the plurality of gate lines 122, and disposed at the bottom portion of the pad area 140. In this same manner, the plurality of data pads 128 are respectively connected with the plurality of data lines 126, and disposed at the left portion of the pad area 140. Thus, the pad area 140 is divided into a gate pad area 142 where the gate pads 124 are placed and a data pad area 144 where the data pads 128 are placed. The gate pads 124 and the data pads 128 act as connection terminals that electrically connect the gate and data lines 122 and 126 to the external driving circuits. The first voltage is applied to the gate pads 124 and then delivered to the gate lines 122. Further, the second voltage is applied to the data pads 128 and then delivered to the data lines 126.

Still referring to FIGS. 3 and 4, the substrate according to the present invention includes the plurality of array cells 100, the plurality of test pad 150, and the plurality of test lines 160. Each test pad 150 corresponds to each array cell 100, and each test line 160 connects each test pad 150 to the corresponding array cell 100. The test pad 150 acts as an input terminal by way of receiving signals from the array testing apparatus during the array test. As shown in FIG. 3, the test pads 150 are generally disposed at the top and bottom peripheries of the substrate.

Further in FIG. 4, each test pad 150 includes at least one gate test pad 152 that is connected with the gate pads 124 of the array cell 100 and at least one data test pad 154 that is connected with the data pads 128. The test line 160 connects the test pad 150 to the gate and data pads 124 and 128 of the array cell 100 such that the test line 160 has a one-to-one connection between the test pad 150 and the corresponding array cell 100. The test line 160 is divided into a gate test line 162 that connects the plurality of gate pads 124 to the gate test pad 152 and a data test line 164 that connects the plurality of data pads 128 to the data test pad 154. Those test pads 150 and lines 160 are formed together with the gate lines 122 and/or the data lines 126 in a same process step.

Figure 1:
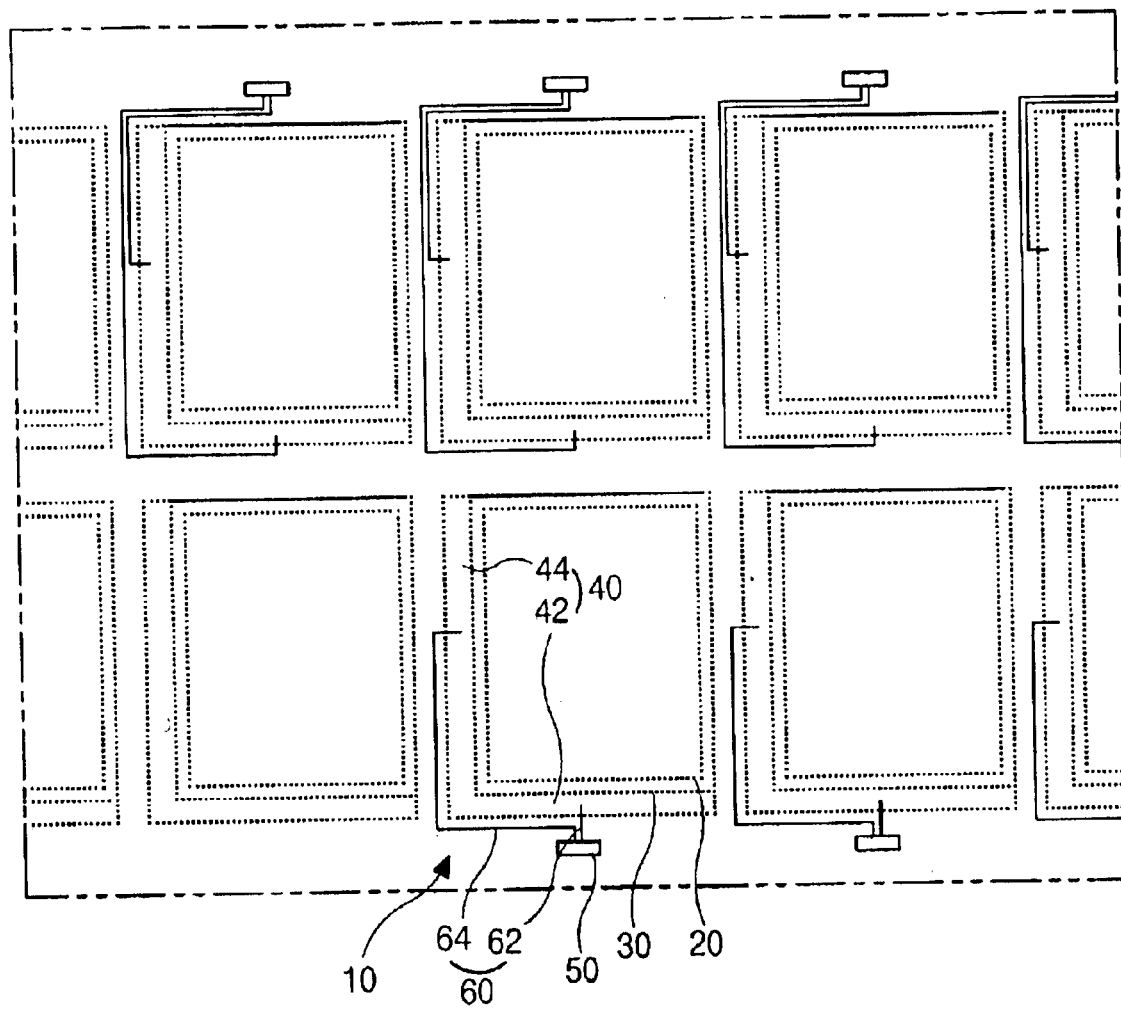
FIG. 1 is a plan view illustrating an array testing substrate having a plurality of array cells according to the related art.
Figure 2:
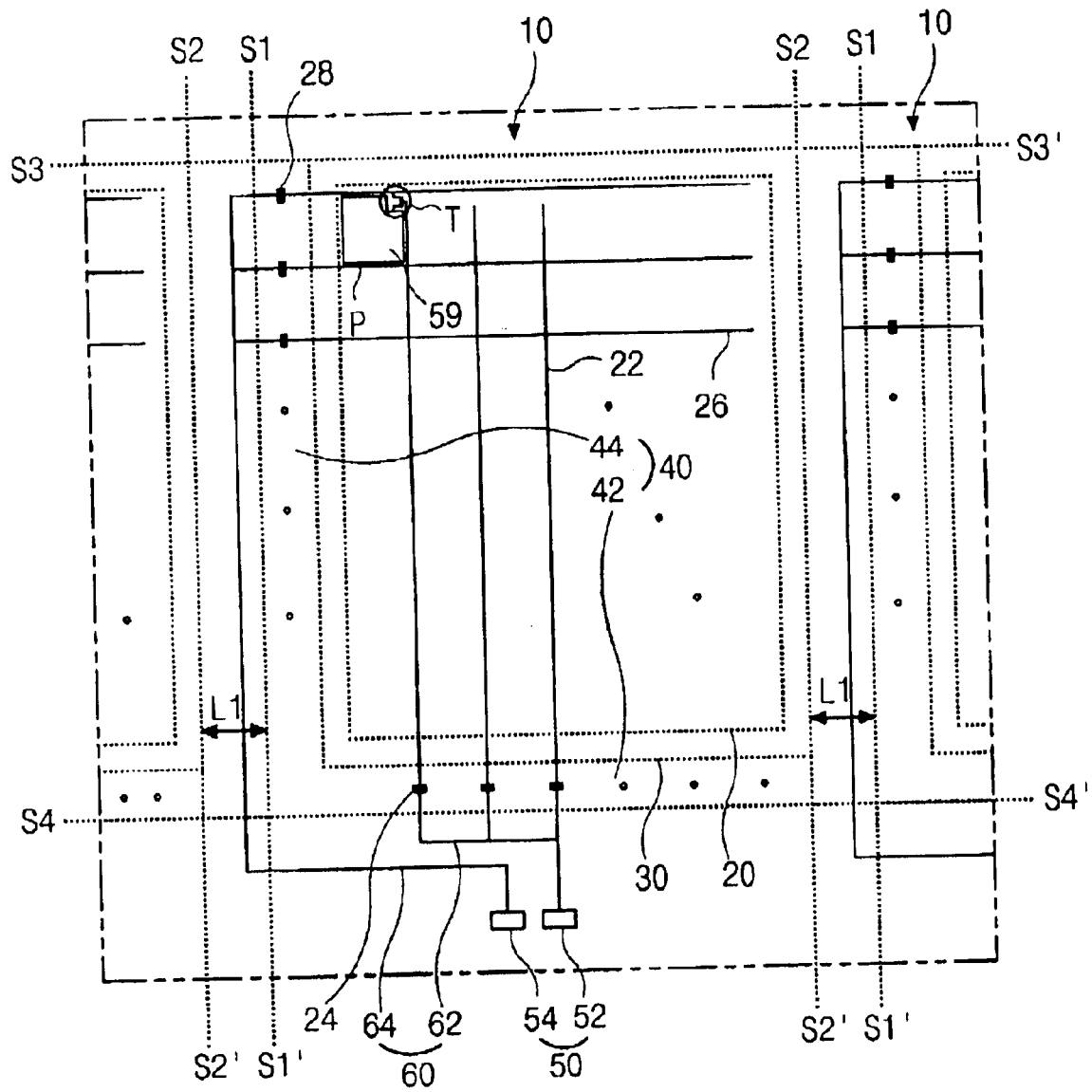
FIG. 2 is an enlarged plan view of an array cell and adjacent array cells of FIG. 1.

In contrast to the related art shown in FIGS. 1 and 2, there are no spaces (L1 of FIG. 2) among the horizontally adjacent array cells 100 according to the present invention. The first array cell A100 is attached to the neighboring array cells B100 and C100. Thus, the data test line A164 corresponding to the first array cell A100 is placed in the right portion of the non-display area B130 of the neighboring second array cell B100. Furthermore, as shown in FIG. 4, the data test line C164 corresponding to the third array cell C100 is placed in the right portion of the non-display area A130 of the neighboring first array cell A100.

The array testing apparatus inspects the above-described inventive substrate by way of applying the first voltage to the gate test pad 152. Thus, the first voltage is delivered to the gate pads and lines 124 and 122 through the gate test line 162. Moreover, the array testing apparatus applies the second voltage to the data test pad 154 to inspect the above-described inventive substrate, and thus, the second voltage is delivered to the data pads and lines 128 and 126 through the data test line 164. While the thin film transistors T are turned on and off by the applied first voltage, the applied second voltage leads to the pixel electrodes 159 of the pixel P. At this time when the pixel electrodes 159 generate electric fields in the pixels P and the electric fields are converted into a light signal, the array testing apparatus perceives and analyzes such light signal and then finds whether each pixel P is defective and whether the gate and data lines 122 and 126 are opened and broken.

Meanwhile, the substrate of the present invention has the elemental component similar to the related art shown in FIGS. 1 and 2, but it is at least distinguishable from the present invention in that the positions of the test lines 160 and the array cells 100 are different from the related art. According to the array substrate of the present invention, the test line 160 connecting the array cell 100 to the corresponding test pad 150 is placed in the neighboring array cell's non-display area 130. That is to increase the effectiveness of spatial availability by way of minimizing the space for test line 160 in between the array cells 100. Hence, the array cells 100 can be arranged close to each other. Namely, the test line 160 passes through the non-display area 130 of the neighboring array cell 100 and connects the corresponding array cell 100 to the corresponding test pad 150.

A detailed explanation about the array substrate of the present invention will be provided with reference to FIG. 4.

As shown in FIG. 4, the first array cell A100 is disposed in the center, and then the second and third array cells B100 and C100 are respectively disposed adjacent on the left and right sides of the first array cell A100. As mentioned before, the letter A is put into the numbers to denote the elemental components of the first array cell A100, the letter B to denote the elemental components of the second array cell B100, and the letter C to denote the elemental components of the third array cell C100.

In FIG. 4, the data pad area A144 of the first array cell A100 borders on the right portion of the non-display area B130 of the second array cell B100, and the right portion of the non-display area A130 of the first array cell A100 borders on the data pad area C144 of the third array cell C100. The test pad A150 corresponding to the first array cell A100 is spaced apart from the gate pad area A142 in the bottom outside of the first array cell A100.

In the first array cell A100, the gate test line A162 easily and directly connects the gate pads A124 to the gate test pad A152. On the other side, the data test line A164 connecting the data pads A128 to the data test pad A154 detours around the data pad area A144 of the first array cell A100 and passes through the right portion of the non-display area B130 of the second array cell B100. Namely, the data test line A164 corresponding to the first array cell A100 connects the data pads A128 to the data pad test pad A154 by taking a roundabout way through the non-display area B130 of the neighboring array cell B100. Furthermore, the above-mentioned manner can be adopted for the third array cell C100 and other array cells. The data test line C164 corresponding to the third array cell C100 passes through the right portion of the non-display are A130 of the first array cell A100, and connects the data pad C128 of the third array cell C100 to the corresponding data test pad (not shown).

Accordingly, when the test lines 164 connects the array cell 100 to the corresponding test pads 150, the portions of the neighboring non-display areas 130 are used such that the array substrate of the present invention does not need the additional and separate spaces for the test line 164 unlike that of the related art.

At this point, although the test lines 164 go through the non-display area 130, the complete liquid crystal display panel adopting this array cell 100 is properly operated. That is, the array substrate is cut along cutting lines S–S' to be separated into the individual array cells 100 so that the test lines 160 are electrically cut. Also, the test pads 156 are cut away from the array cell 100 during the cutting process.

In FIG. 4, the first cutting line S1–S1' corresponds to a border between the non-display area 130 and the data pad area 144 of the neighboring array cell 100. The second cutting line S2–S2' corresponds to a top outer line of the non-display area 130, and the third cutting line S3–S3' corresponds to a bottom outer line of the gate pad area 142. When the array substrate is divided into the array cells 100 along the cutting lines S–S', each individual array cell 100 includes the neighboring array cell's test line. However, since the neighboring array cell's test line is electrically disconnected with other layer elements, the liquid crystal display panel adopting this array cell has a proper operation and is not effected by the disconnected test line. For example, although the first each array cell, A100, for example, has the test line C164 of the third array cell C100, the liquid crystal display panel having this first array cell A100 is appropriately operating.

Meanwhile, although the present invention is explained to be that the data pad area 144 is disposed on the left portion of the array cell 100 and the gate pad area 142 is disposed in the bottom of the array cell 100, the gate and data pad areas 142 and 144 can switch their positions.

According to the present invention alluded above, since the test line passes through the non-display area of the neighboring array cell to connect the corresponding array cell to the corresponding test pad, the additional spaces between the array cells are not required. Therefore, the array substrate can effectively have the improved spatial availability.

It will be apparent to those skilled in the art that various modifications and variations can be made in the array substrate of the present invention without departing from the spirit or scope of the invention. Thus, it is intended that the present invention cover the modifications and variations of this invention provided they come within the scope of the appended claims and their equivalents.

What is claimed is:

1. A substrate having an array testing system for use in a liquid crystal display device, comprising:
    a plurality of array cells each including a display area, a non-display area surrounding the display area, and a pad area disposed adjacent to first and second sides of the non-display area;
    a plurality of test pads disposed outside the plurality of array cells; and
    a plurality of test lines each connecting a corresponding one of the array cells with a corresponding one of the test pads, each one of the test lines partially passing through the non-display area of an array cell adjacent to the corresponding one of the array cells.

2. The substrate according to claim 1, further comprising:
    a plurality of gate lines and a plurality of data lines respectively in column and row directions in the display area;
    a plurality of pixels disposed in the display area and defined by the crossed plurality of gate and plurality of data lines;
    a plurality of gate pads each connected with respective ones of the plurality of gate lines and disposed in a gate pad area; and
    a plurality of data pads each connected with respective ones of the plurality of data lines and disposed in a data pad area,
    wherein each pad area includes a corresponding gate pad area disposed at the first side of the corresponding non-display area and a corresponding data pad area disposed on the second side of the corresponding non-display area,
    wherein each test pad includes at least one gate test pad and at least one data test pad, and
    wherein each test line includes at least one gate test line connecting the plurality of gate pads to the gate test pad and at least one data test line connecting the plurality of data pads to the data test pad.

3. The substrate according to claim 2, wherein the gate test line of each array cell passes through a portion of the non-display area of the adjacent array cell to connect the plurality of gate pads to the gate test pad of the corresponding array cell.

4. The substrate according to claim 2, wherein the data test line passes through a portion of the non-display area of the neighboring array cell to connect the plurality of data pads to the data test pad of the corresponding array cell.

5. The substrate according to claim 1, wherein the plurality of array cells are adjacent to each other in a row direction and the plurality of test pads are disposed in at least one of top and bottom peripheries of the substrate.

6. The substrate according to claim 5, wherein the pad area of each array cell includes an area adjacent to the non-display array of an adjacent one of the array cells.

7. A method of manufacturing a liquid crystal display device, comprising the steps of:
    forming a plurality of array cells on an array substrate, each array cell including a display area, a non-display area surrounding the display area, and a pad area disposed adjacent to first and second sides of the non-display area;
    forming a plurality of test pads on the array substrate each disposed outside the plurality of array cells;
    forming a plurality of test lines on the array substrate each connecting a corresponding one of the array cells with a corresponding one of the test pads, each one of the test lines partially passing through the non-display area of an array cell adjacent to the corresponding one of the array cells;
    testing the array substrate using the test pads and the test lines; and
    dividing the array substrate into individual array cells.

8. The method according to claim 7, wherein the dividing step includes dividing the plurality of array cells along first, second, and third cutting lines that remove the test pads and disrupt the test lines.

9. The method according to claim 8, wherein one of the first, second, and third cutting line divides the non-display area and the pad area of a pair of adjacent ones of the plurality of array cells.

10. The method according to claim 9, wherein the other two of the first, second, and third cutting lines correspond to top and bottom outer lines of the non-display areas with respect to the pair of adjacent ones of the plurality of array cells.

11. The method according to claim 7, wherein each pad area includes a corresponding gate pad area disposed at the first side of the corresponding non-display area and a corresponding data pad area disposed on the second side of the corresponding non-display area, wherein each test pad includes at least one gate test pad and at least one data test pad, and wherein each test line includes at least one gate test line connecting the plurality of gate pads to the gate test pad and at least one data test line connecting the plurality of data pads to the data test pad.

12. The method according to claim 11, wherein the gate test line of each array cell passes through a portion of the non-display area of the adjacent array cell to connect the plurality of gate pads to the gate test pad of the corresponding array cell.

13. The method according to claim 11, wherein the data test line passes through a portion of the non-display area of the neighboring array cell to connect the plurality of data pads to the data test pad of the corresponding array cell.

14. The method according to claim 7, wherein the plurality of array cells are adjacent to each other in a row direction and the plurality of test pads are disposed in at least one of top and bottom peripheries of the substrate.

15. The method according to claim 14, wherein the pad area of each array cell includes an area adjacent to the non-display area of an adjacent one of the array cells.

16. The method according to claim 7, further comprising the steps of:
    forming a plurality of gate lines and a plurality of data lines respectively in column and row directions in the display area;
    forming a plurality of pixels disposed in the display area and defined by the crossed plurality of gate lines and plurality of data lines;
    forming a plurality of gate pads each connected with respective ones of the plurality of gate lines and disposed in a gate pad area; and
    forming a plurality of data pads each connected with respective ones of the plurality of data lines and disposed in a data pad area.

17. The method according to claim 7, further comprising the step of assembling the array substrate with a color filter substrate with liquid crystal material disposed between the array substrate and the color filter substrate before the dividing step.

18. The method according to claim 7, wherein the testing step includes the step of using an array tester.

\* \* \* \* \*